Figure 4:
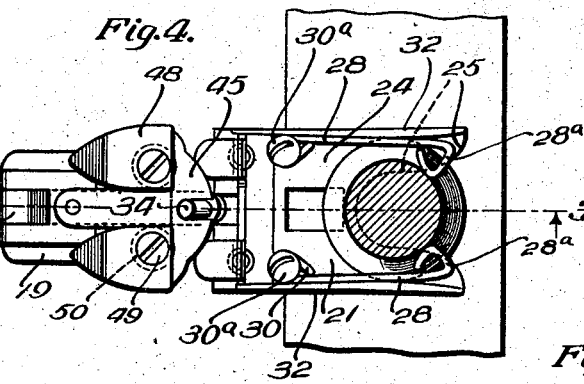

Oct. 4, 1927.
A. COOK
1,644,414
BAND TYING GAUGE
Filed July 2, 1924    2 Sheets-Sheet 1
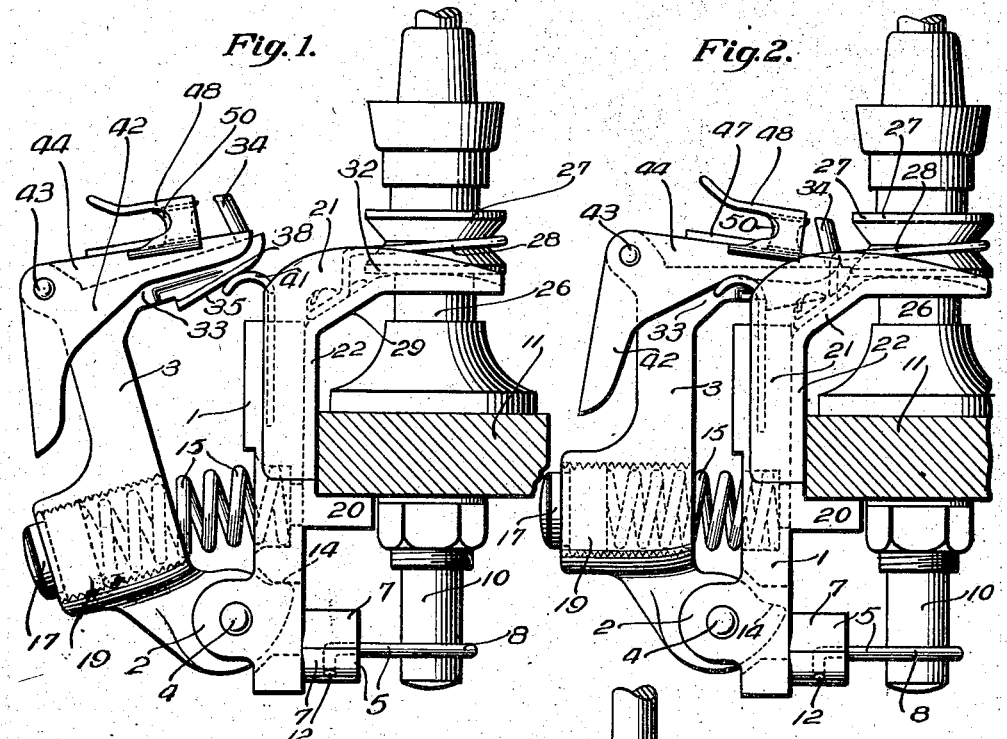
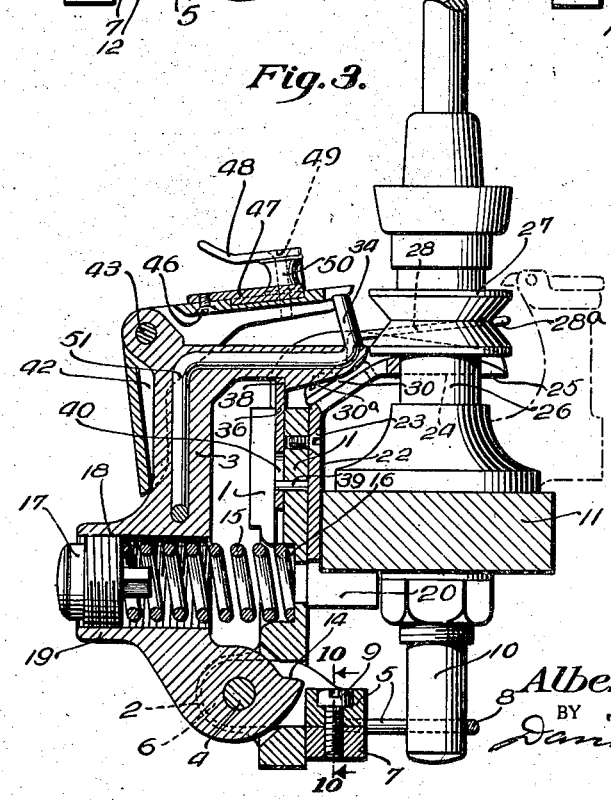
INVENTOR
Albert Cook
BY
ATTORNEYS Oct. 4, 1927.

A. COOK 1,644,414

BAND TYING GAUGE

Filed July 2, 1924   2 Sheets-Sheet 2

INVENTOR
*Albert Cook*
BY
ATTORNEYS.

Patented Oct. 4, 1927.

1,644,414

UNITED STATES PATENT OFFICE.

ALBERT COOK, OF HOLYOKE, MASSACHUSETTS.

BAND-TYING GAUGE.

Application filed July 2, 1924. Serial No. 723,838.

This invention relates to improvements in gauges for use in tying driving bands of band driven machines, with a regulated tension, the improved device being especially adapted for use in tying the spindle driving bands of spinning or twisting frames.

The invention has for its object to provide a simple and durable device of the character set forth so constructed as to decrease the labor and time required in tying bands.

Figure 5:
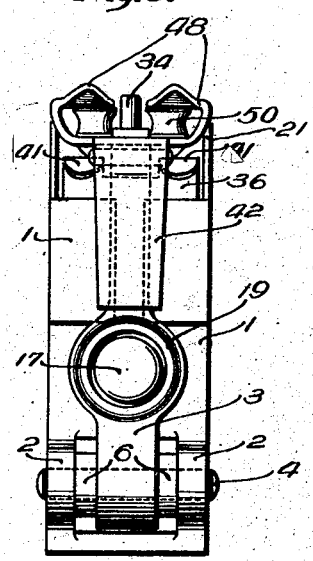
Figure 7:
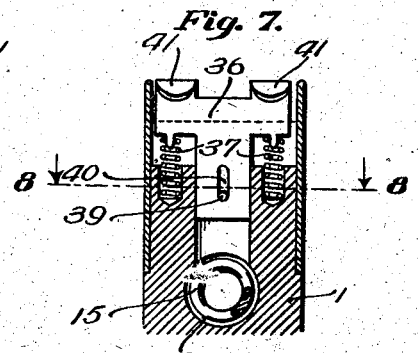
Figure 6:
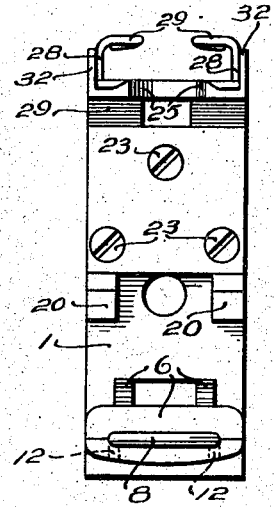
Figure 8:
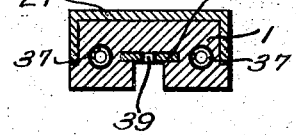
Figure 9:
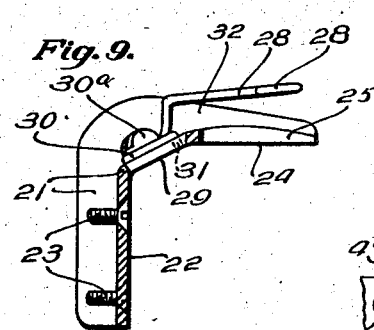
Figure 10:
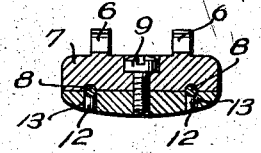

In the drawings Fig. 1 is a side elevation of the device attached to a spindle rail ready for use;

Fig. 2 a similar view showing the pivoted tension controlling member in locked position;

Fig. 3 a vertical sectional view of the device on the line 3—3 of Fig. 4, the band throw-off lever being shown tripped;

Fig. 4 a plan view of the device, the parts being in the position shown in Fig. 2, the spindle pulley being shown in section;

Figs. 5 and 6 end elevations respectively of the outer and inner faces of the device;

Fig. 7 a detail sectional view showing the device for locking the tension regulating member;

Fig. 8 a sectional view taken on the line 8—8 of Fig. 7;

Fig. 9 a sectional view of a detail of the device;

Fig. 10 a detail sectional view on the line 10—10 of Fig. 3; and

Figure 11:
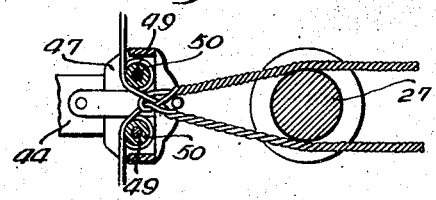
Figure 12:
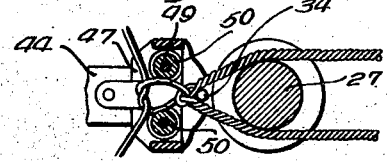

Figs. 11 and 12 diagrammatic views illustrating the tying of a band.

The device comprises an attachment and positioning member 1 which is slotted at its lower end and provided with lugs 2 at the opposite vertical sides of the slot. Between these lugs the lower end of a swinging tension regulating member 3 is pivotally held by a suitable pivot pin 4. A horizontal bracket 5 is carried by the member 1 near its lower end, said bracket being on the opposite side of the member 1 from the tension member and adapted to extend under the spindle rail. The bracket 5 is formed with two lugs 6 which extend through the slot in the member 1 and are secured in position by the pivot pin 4. The lugs 6 snugly fit the slot so that there can be no free up-and-down movement of the bracket 5 independently of the member 1. Two major parts 7 and 8 comprise the bracket. The part 7 has the lugs 6 formed thereon, and this part projects outwardly a short distance from the member 1. The projecting portion of the part 7 is formed in halves that are separable on a horizontal plane and are adapted to be held together by a central screw 9. The part 8 of the bracket is in the form of a loop that is adapted to engage the lower end of a spindle bearing or bolster 10, which depends from the rail 11 of the spinning frame. This loop is substantially U-shaped, is preferably made of wire and is formed at its ends with short downturned portions 12. The ends of the loop are adapted to be clamped in grooves formed in the abutting faces of the separable halves of the part 7 of the bracket, and the downturned ends 12 are received in vertical openings 13 in the lower half. Owing to this structure the loop 8 may be readily removed by simply unscrewing the screw 9 and removing the lower half of the part 7. Provision is thus made for readily removing one loop and substituting another of a different size to accommodate the device to spindle bearings 10 of different sizes. The loop is preferably of the same width transversely as the diameter of the spindle bearing upon which it is to be used but has considerably greater length to facilitate its engagement with the bearing.

The tension member 3 is formed with an extension or abutment 14 at its lower end which is adapted to engage the upper wall of the slot in the member 1 between the lugs 6 and to serve as a stop to limit the outward and downward swinging movement of the tension member away from the support or positioning member 1. The tension member 3 is mounted on the pivot 4 between the lugs 6 as clearly shown in Fig. 5. The tension member 3 is normally swung away from the support or positioning member 1 to the limit of the movement permitted by the lug 10 by a tension-regulating spring 15. One end of this spring is confined in a socket 16 formed in the member 1, and the other end thereof abuts against the end of an externally threaded plug or nut 17 screwed into the outer end of a cylindrical bore or passage 18 extending through extension member 3, said bore or passage being formed in a cylindrical enlargement 19 of said member. The nut 17 is provided with an interior angular longitudinally extending projection which is adapted to be engaged by a wrench for adjusting the nut to vary the tension of the spring 15. Said wrench may be inserted through an aperture in the member 1 and longitudinally through the spring and passage 17. The member 1 is formed at opposite sides of the wrench opening therein with a pair of stop lugs 20 that are adapted to engage the under face of the rail 11 of the spinning frame.

A bracket 21 is removably secured to the upper end of the member 1. This bracket is formed with a vertically extending portion 22 overlapping the upper end of the member 1 for a considerable distance and secured thereto by screws 23, and a horizontally extending portion 24 which is designed to project rearwardly or inwardly over the spindle rail when the device is in operative position. The free end of the portion 24 is cut out or notched as at 25 to fit around and engage the spindle bearing 26 directly beneath the spindle whorl, said notch being of such size as to accurately center the bracket on the spindle bearing. The bracket 21 is of channel form in cross section and the member 1 has its faces recessed, as shown, to receive the channel form of the portion 22, so that the outer faces of said portion 22 will be flush with the faces of the member 1.

A pair of resilient gripping arms 28 preferably made of wire are secured to opposite sides of an inclined portion 29 of the upper face of the bracket 21 and project toward the free end of the bracket. The free ends of these side arms are bent inwardly toward each other and then back upon themselves to form triangular gripping jaws 28ª. These jaws are adapted to be forced over the central grooved portion of the spindle whorl to yieldingly engage it and hold the tying device in position. The end of each resilient arm 28 opposite the jaw 28ª is formed with a loop 30 and is downturned at the end as at 31. An attaching screw 30ª passes through the loop 30 and into the bracket, and the down-turned end 31 engages in a small opening in the bracket to prevent the arm from turning upon the screw. The upper face of the horizontal portion 22 of the bracket is adapted to engage the under face of the spindle whorl and the whorl engaging portions of the resilient arms 28 are so spaced above the upper face of the portion 24 that when forced around the whorl they will engage the lower flange thereof and hold the whorl yieldingly down upon the said face of the bracket. The upturned flanges 32 of the channel-form bracket extend adjacent the lower edge of the whorl and also engage the arms 28 at points spaced from their free ends to prevent them from being accidentally spread too far apart. To facilitate the engagement of the bracket portion 24 and the resilient arms 28 with the whorl the said arms diverge upward slightly from the bracket, and the sides and bottom of the free ends of the channel-form bracket are beveled to provide a flared mouth adapted to readily receive the lower part of the whorl. There are decided advantages in making the bracket 21 separable from the member 1. The bracket may be readily removed and replaced by a bracket adapted to fit a whorl of different size. Also, as the bracket is subjected to strong wear in snapping it on and off the whorl, it is desirable to make it of more durable material than the member 1 which is preferably a casting. The casting of member 1 is also simplified thereby.

The member 3 is provided at its upper free end with an arm 33 carrying at its inner or free end an upwardly extending tying hook 34 around which the spindle driving band is passed in the operation of tying the band as indicated in Figs. 11 and 12. The free end of the arm 33 is beveled outwardly and downwardly to form a cam surface 35 adapted to engage and ride over the upper end of a vertically slidable latch 36 and to depress said latch against the pressure of springs 37 when the member 3 is swung toward member 1. The arm 33 is provided with a locking shoulder 38 which is adapted to snap back of the latch bar 36 to lock the tension member 3 against movement after the same is swung a predetermined distance toward the spindle. The latch 36 is confined in a vertical cleft formed in the upper end of the member 1 as shown in Figs. 3 and 7; and the springs 37 are mounted in sockets in said member. A pin 39 mounted in member 1 and engaging in a slot 40 in the latch bar serves to limit the movement of the latch bar. The latch bar at its upper end is provided with two outwardly extending finger pieces 41, one on each side of the arm 39, and said finger pieces are adapted to be depressed by the operator when he desires to release the tension member from the latch 36.

A sheet metal cast-off angle lever, or doffer 42 is pivoted by a pin 43 to the upper end of the tension member. One arm 44 of said angle lever lies along the upper surface of the tension member, while the other extends downwardly and outwardly by the side of said lever. The upper portion of said arm is cut out at its free end to provide a cast off fork 45 which lies on opposite sides of the tying hook 34. Removably secured upon the cast-off lever inwardly of the fork 45, by means of a screw 46 is a plate 47. This plate is turned upwardly at the sides and inwardly parallel to the body portion thereof as at 48. Pivotally mounted between said inturned portions and the body of the plate upon screws 49 are a pair of laterally spaced, grooved, guiding and retaining rollers 50. These rollers are spaced rearwardly and at either side of the tying hook 34. The purpose of these guiding and retaining rollers is to hold the band on the tying hook during the operation of pulling the ends of the band in order to place the proper tension on the band. In Fig. 11 the operation of these retaining and guiding rollers is illustrated. Spindle driving bands are usually formed of two strands twisted together. A loop is formed at one end and at the other end the two strands are separated. One of these separated ends is passed through the said loop in one direction and the other is passed through the loop in the opposite direction when it is desired to tie the band to the spindle. As shown in Fig. 11, the separated strands, after they have been passed through the loop in the end of the band, are passed outwardly in opposite directions under the guiding and retaining rollers 50. The inturned portions 48 of the plate 47 above the rollers extend rearwardly of the rollers to form guards and are flared upwardly to facilitate the entrance of the strands to the rollers. These guards combine with the rollers 50 to form in effect guiding and retaining hooks. It is manifest that these hooks serve to hold the band down on the tying hook 34 and prevent it sliding off said hook during the operation of tying the band. The plate 47 carrying the rollers 50 and having the said guards formed thereon is preferably made of durable sheet metal while the tension member 3 is preferably a casting. The said plate is readily removable from the casting in case of breakage of either part and the plate may be replaced by another plate of different proportions or having differently spaced rollers to suit different conditions.

The tying hook 34 which projects upwardly from the free end of the arm 33 of the tension member is formed from one end of a strand of thick wire 51 that is cast in the tension member 3 and extends longitudinally through the center of the arm 33 and downwardly through the main portion of the tension member to a point adjacent the spring passage 18. The casting is greatly strengthened by this wire and the hook 34 is securely anchored.

The operation of tying the band is as follows:

The lower end of the spindle bearing 10 is engaged in the loop 8 of the bracket 5, and the member 1 is then swung upwardly to bring its inner face into engagement with the spindle rail 11 and to cause the spring jaws 28ª to engage the whorl 27 within the groove therein. The notch or recess 25 of the bracket 21 receives the spindle bearing and the bracket bears against the lower face of the whorl. All of these parts serve to center the member 1 properly and to hold it against the spindle rail. The tension member 3 is free of the latch 42 and the spring 15 forces it forwardly, that is to say, toward the operator, and downwardly to the limit of its movement. The lug 13 serves as a limit stop. The spindle driving band is then passed around the drive pulley or cylinder and on opposite sides of the spindle whorl and its ends brought together in front of the tying lug 34. One strand of the band is passed through the end loop of the band in one direction and the other strand is passed through said loop in the opposite direction. The separated strands are then passed laterally in opposite directions under the retaining hooks formed by the guards 48 and the rollers 50. The operator then pulls outwardly on the said strands. This causes the strands to bear strongly against the rollers. It will be understood that as the strain is put on the separated strands they are pulled out or unraveled from the main body of the band. This shortens the band and puts a strain on the rollers of the retaining hooks and draws the tension member upwardly and toward the spindle. It sometimes occurs that the looped end of the band will remain between the retaining hooks during the tying operation and will not engage the tying hook. In this event the strain of the strands on the retaining hooks will force the tension member upwardly to its latched position and the looped end of the band will engage the tying hook when the strain on the two strands is relieved. The amount of tension required to throw the tension member to its latched position will depend upon the adjustment of the spring 15. When the band has been contracted sufficiently to place the desired amount of tension on the tension member, said member will have been swung upwardly to its latched position, as illustrated in Fig. 3. This takes the tension of spring 15 off the band and the knot may then be completed by tying the two strands together as indicated in Fig. 12. The tying of the band is then completed and by forcing the depending arm of the doffer lever 42 toward the lever 3, the cast-off fork 45 will lift the tied band off the tying hook and allow it to drop between the flanges of the spindle whorl. The whorl is ordinarily free to have a certain amount of vertical play, but when the tension device is in position the whorl is held accurately and firmly in position by the spring arms 28 and the bracket arm 24, to receive the band when it is cast off of the tying hook by the doffer. The bracket arm with its upwardly extending flanges prevents the band slipping down under the whorl during the tying and cast off operations. The rollers 50 facilitate the tensioning operation and by reducing the friction avoid the possibility of breaking the strands of the band when they are drawn out sharply to either side as shown in Fig. 11.

When the tying operation is completed and the band has been released from the tying hook, the latch plate 36 is depressed and the tension member thereby released. The device may then be quickly removed from the spindle. Of course, the device may be removed from the spindle without releasing the tension member, but it is the usual practice to release the tension member and to allow the kick, produced by the tension member flying outwardly to release the device from the spindle.

What I claim is:

1. A gauge for tying bands about spindle whorls comprising an attachment member, resilient means carried thereby adapted to yieldably engage the spindle whorl to hold the attachment member to the whorl and to prevent relative vertical movement therebetween, and a movable band engaging and tensioning member yieldably held to the attachment member.

2. A gauge for tying bands about spindle whorls comprising an attachment member, an abutment carried thereby and adapted to engage the under side of the spindle whorl, resilient means carried by the attachment member adapted to yieldably engage the spindle whorl and yieldably hold it down upon said abutment, and a movable band engaging and tensioning member yieldingly held to the attachment member.

3. A gauge for tying bands about spindle whorls comprising an attachment member, resilient means carried thereby adapted to engage the spindle whorl within the band receiving groove thereof to yieldably hold the attachment member to the whorl and adapted to prevent relative vertical movement therebetween, and a movable band engaging and tensioning member yieldingly held to the attachment member.

4. A gauge for tying bands about spindle whorls comprising an attachment member, a pair of yieldable resilient gripping arms carried thereby and adapted to be snapped over the diameter of the spindle whorl within the band receiving groove thereof said arms being adapted to yieldably hold the attachment member to the whorl and adapted to prevent relative vertical movement therebetween, and a movable band engaging and tensioning member yieldingly held to the attachment member.

5. A gauge for tying bands about spindle whorls comprising an attachment member, an abutment carried by the attachment member adapted to engage the under side of the spindle supporting rail, resilient means carried by the attachment member adapted to engage the spindle whorl to yieldably hold the attachment member to the whorl and adapted to prevent relative vertical movement therebetween, and a movable band engaging and tensioning member yieldingly held to the attachment member.

6. A gauge for tying bands about spindle whorls comprising an attachment member, a removable bracket mounted thereon said means mounted on the bracket adapted to engage the spindle whorl and yieldably hold the attachment member to the whorl and adapted to prevent relative vertical movement therebetween, and a movable band engaging and tensioning member yieldingly held to the attachment member.

7. A gauge for tying bands about spindle whorls comprising an attachment member, a removable bracket mounted thereon said bracket being formed with a fork adapted to abut against the under side of the spindle whorl and to engage the spindle bearing to center the attachment member with the whorl, means mounted on the bracket adapted to engage the spindle whorl to yieldably hold the attachment member to the whorl and to yieldably hold the whorl down upon the said fork, and a movable band engaging and tensioning member yieldingly held to the attachment member.

8. A gauge for tying bands about spindle whorls comprising an attachment member, means carried thereby to engage a spindle support, a movable band engaging and tensioning member yieldingly held to the attachment member and provided with a band tying hook to engage the band during the tying operation, a retaining hook carried by the tension member and adapted to be engaged by one of the separated strands of the band to hold the band on the tying lug during the tying operation, and an anti-friction roller pivoted within the retaining hook and adapted to be engaged by the said strand.

9. A gauge for tying bands about spindle whorls comprising an attachment member, means carried thereby to engage a spindle support, a movable band engaging and tensioning member yieldingly held to the attachment member and provided with a band tying hook to engage the band during the tying operation, and two upstanding grooved rollers carried by the tensioning member, said rollers being spaced from the tying hook and spaced apart laterally to permit the knot in the band to be formed therebetween and to permit the free ends of the strands to be drawn in opposite directions against them to place the desired tension on the band to contract it and move the tension member toward the spindle.

10. A gauge for tying bands about spindle whorls comprising an attachment member, means carried thereby to engage a spindle support, a movable band engaging and tensioning member yieldingly held to the attachment member and provided with a band tying hook to engage the band during the tying operation, a cast-off lever pivoted on the tension member and having one arm adapted to detach the tied band from the tying lug, and two upstanding grooved anti-friction rollers pivoted upon said arm of the cast-off lever spaced from the tying hook and spaced apart laterally of the lever arm to permit the knot in the band to be formed between said rollers and to permit the free ends of the strands to be drawn in opposite directions against said rollers to place the desired tension on the band to contract it and move the tension member toward the spindle.

11. A gauge for tying bands about spindle whorls comprising an attachment member, means carried thereby to engage a spindle support, a movable band engaging and tensioning member yieldingly held to the attachment member and provided with a band tying hook to engage the band during the tying operation, a cast-off lever pivoted on the tension member and having one arm adapted to detach the tied band from the tying hook, and a removable unit mounted upon said arm of the cast-off lever said unit comprising a base and a pair of upstanding grooved anti-friction rollers mounted on said base spaced from the tying hook and spaced apart laterally of the lever arm to permit the knot in the band to be formed between the said rollers and to permit the free ends of the strands to be drawn in opposite directions against said rollers to place the desired tension on the band to contract it and move the tension member toward the spindle.

12. A gauge for tying bands about spindle whorls comprising an attachment member, means carried thereby to engage a spindle support, a movable band engaging and tensioning member yieldingly held to the attachment member and provided with a band tying hook to engage the band during the tying operation, a cast-off lever pivoted on the tension member and having one arm adapted to detach the tied band from the tying hook, and a removable unit mounted upon said arm of the cast-off lever said unit comprising a base plate formed with two upstanding retaining hooks and anti-friction rollers within the retaining hooks, the said hooks being spaced from the tying hook and spaced apart laterally of the lever arm to permit the knot in the band to be formed therebetween and to permit the free ends of the strands to be drawn in opposite directions against the said rollers to place the desired tension on the band to contract it and move the tension member toward the spindle.

13. A gauge for tying bands about spindle whorls comprising an attachment member, a movable band engaging and tensioning member yieldably held to the attachment member, means carried by the attachment member to engage a spindle bearing above the spindle supporting rail, and a loop carried by the attachment member and adapted to engage the spindle bearing below the supporting rail, said loop being removably clamped to the attachment member.

14. A gauge for tying bands about spindle whorls comprising an attachment member, means carried thereby to engage a spindle support, a movable band engaging and tensioning member yieldingly held to the attachment member said tensioning member being in the form of a casting having an upwardly extending portion and a laterally extending arm, and a band tying hook extending upwardly from the free end of said arm and adapted to engage the band during the tying operation, said hook being formed with a root cast in the tensioning member and extending longitudinally through said arm and upwardly extending portion of the tension member.

In testimony whereof I hereunto affix my signature.

ALBERT COOK.